(12) United States Patent
Lefebvre et al.

(10) Patent No.: US 7,508,765 B2
(45) Date of Patent: Mar. 24, 2009

(54) NETWORK STATUS REPORTING METHOD AND A COMMUNICATIONS NETWORK

(75) Inventors: Pascal Albert Emile Lefebvre, Brussels (BE); Ivan Verbesselt, Londerzeel (BE)

(73) Assignee: Alcatel, Paris (FR)

( * ) Notice: Subject to any disclaimer, the term of this patent is extended or adjusted under 35 U.S.C. 154(b) by 687 days.

(21) Appl. No.: 09/737,471

(22) Filed: Dec. 18, 2000

(65) Prior Publication Data

US 2001/0004350 A1    Jun. 21, 2001

(30) Foreign Application Priority Data

Dec. 21, 1999   (EP)   ................................. 99403256

(51) Int. Cl.
*H04L 12/26* (2006.01)
*H04L 1/00* (2006.01)

(52) U.S. Cl. ...................................... 370/236; 370/231

(58) Field of Classification Search ............. 370/236.1, 370/236.2, 236, 232, 235, 352
See application file for complete search history.

(56) References Cited

U.S. PATENT DOCUMENTS

| | | | | |
|---|---|---|---|---|
| 5,367,523 A * | 11/1994 | Chang et al. | ................. | 370/235 |
| 5,633,859 A * | 5/1997 | Jain et al. | ..................... | 370/234 |
| 5,867,483 A | 2/1999 | Ennis, Jr. et al. | | |
| 5,901,140 A * | 5/1999 | Van As et al. | ................ | 370/236 |
| 5,936,940 A * | 8/1999 | Marin et al. | ................ | 370/232 |
| 6,011,777 A * | 1/2000 | Kunzinger | ................ | 370/236.1 |
| 6,349,096 B1 * | 2/2002 | Liu et al. | ..................... | 370/352 |
| 6,374,288 B1 * | 4/2002 | Bhagavath et al. | ........... | 709/203 |
| 6,404,861 B1 * | 6/2002 | Cohen et al. | ............. | 379/93.01 |
| 6,529,479 B1 * | 3/2003 | Suzuki | ..................... | 370/236.1 |
| 6,542,465 B1 * | 4/2003 | Wang | ......................... | 370/232 |
| 6,640,239 B1 * | 10/2003 | Gidwani | ..................... | 709/203 |
| 6,657,961 B1 * | 12/2003 | Lauffenburger et al. | ...... | 370/231 |
| 6,657,963 B1 * | 12/2003 | Paquette et al. | ............. | 370/236 |
| 6,765,904 B1 * | 7/2004 | Anandakumar et al. | ...... | 370/389 |
| 6,798,744 B1 * | 9/2004 | Loewen et al. | ............... | 370/235 |
| 6,829,294 B2 * | 12/2004 | Sweitzer et al. | ............. | 375/225 |
| 6,891,851 B1 * | 5/2005 | Demakakos | ................. | 370/467 |
| 6,963,538 B1 * | 11/2005 | Giroux et al. | ............. | 370/236.1 |

(Continued)

FOREIGN PATENT DOCUMENTS

EP    0 446 956 A2    9/1991

(Continued)

OTHER PUBLICATIONS

U.S. Appl. No. 60/161,420.*

(Continued)

*Primary Examiner*—Firmin Backer
*Assistant Examiner*—Clemence Han
(74) *Attorney, Agent, or Firm*—Sughrue Mion, PLLC

(57) ABSTRACT

The present invention relates to a network status reporting method, for reporting in a communications network a network status to a data source with an adaptive transmission rate. The data sink reports the network status to the data source in order to enable the data source to adapt the transmission rate based on the network status. The communications network further contains at least one intermediate network node, and a data sink. Only the data sink reports to the data source on a status of the communications network in its neighborhood, and no intermediate network node reports to the data source on said network status of the communications network.

24 Claims, 1 Drawing Sheet

U.S. PATENT DOCUMENTS

2002/0080722 A1 * 6/2002 Uriu et al. ................ 370/236.1

FOREIGN PATENT DOCUMENTS

WO    WO 0 95/29549    11/1995

OTHER PUBLICATIONS

"Traffic Management Specification Version 4.0" Natalie Giroux, Apr. 1996, by ATM Forum (ATMF) Technical Committee, pp. 7-11.

Maxemchuk, N. F. et al.: "Routing and Flow Control in High-speed wide-area Networks" Proceedings of the IEEE, US, IEEE, New York, vol. 28, No. 1, Jan. 1, 1990, pp. 204-220, XP000125850 ISSN: 0018-9219.

* cited by examiner

NETWORK STATUS REPORTING METHOD AND A COMMUNICATIONS NETWORK

BACKGROUND OF THE INVENTION

The present invention relates to a method for reporting network status, in a communications network, to a data source with an adaptive transmission rate in order to enable said data source to adapt said transmission rate based on said network status, said communications network further containing at least one intermediate network node and a data sink, and also relates to a communications network comprising at least one data source with an adaptive transmission rate, at least one intermediate node and at least one data sink, with the data source being able to adapt the transmission rate on the basis of network status information.

Such a method and communications network are already known in the art, e.g. from the section Flow Control Model and Service Model for the ABR Service Category, pages 7-11 in *"Traffic Management Specification Version 4.0"* from the author Natalie Giroux published in April 1996 by the ATM Forum (ATMF) Technical Committee.

Therein, the Available Bit Rate flow control is described. This Available Bit Rate flow control occurs between a data source, called a sending end-system and a data sink, called a receiving end-system. A data source and a data sink are connected via bi-directional connections over a communication network containing a number of intermediate network nodes, called network elements. In this Available Bit Rate flow control method, the intermediate network nodes and the data sink report to the data source on congestion in the communications network.

A source generates forward RM-cells, which are turned back by the data sink and sent back to the source as backward RM-cells. These backward RM-cells carry feedback information provided by the intermediate network nodes and the data sink, to the data source. An intermediate network node directly inserts feedback control information into RM-cells when they pass in the forward or backward direction and indirectly informs the data source about congestion. The data sink will update this congestion information in RM-cells, and generate backward RM-cells. The data source then adapts its traffic in accordance with the feedback in order to get a low cell loss ratio. Determination and reporting of network congestion by each of the intermediate network nodes together with the data sink in this flow control method, leads to a very complex approach. At present the stability of this approach is not proven. Moreover, the complexity it introduces into the network is considerable. Besides, it is not possible to support this mechanism in a heterogeneous network hosting different transport technologies such as Asynchronous Transfer Mode and Frame Relay as it requires all the nodes involved, to support the ABR mechanism.

SUMMARY OF THE INVENTION

An object of the present invention is to provide a network status reporting method of the above known type and a communications network but whose implementation is less complex and which consequently can be introduced in a heterogeneous environment, like the internet.

According to the invention, this object is achieved by a method wherein the data sink reports to the data source on a status of the communications network in its neighborhood, and no intermediate network node reports to the data source on the network status of the communications network. The object of the invention is further attained by a communications network wherein the data sink is able to report the network status information of the communications network to the data source and no intermediate node is able to report network status information to the data source. The object of the invention is still further attained by a data source and data sink adapted to be used in the method and network described above.

In this way, by only introducing functionality in the data sink that is able to report network status information to the data source to thereby enable the data source to adapt the sending rate, and introducing functionality in the data source in order to interpret the notification and to subsequently adapt the transmission rate, the data loss rate is decreased and because only the data sink and the data source are involved, there is no additional complexity within the communications network. The intermediate network nodes are switching or routing network nodes constituting the backbone network, only participating in the method for so far that a received report is forwarded. Because only the edge network needs adaptation, the current invention can be implemented in any heterogeneous network, like the internet.

The data sink may be either the line termination element of an access network, such as an ADSL (Asymmetric Digital Subscriber Line) DSLAM (Digital Subscriber Line Access Multiplexer) or the network termination element of an access network, such as an ADSL modem, within the communications network. These are alternative solutions for the implementation of the data sink.

According to a further characteristic feature of the invention, the network status is a capacity of a link between a network termination and a line termination in the access network of the communications network.

The network status is determined based on the current data transmission rate on the line between the line termination element and the network termination element in an access network within the communications network. In case of a rate adaptive digital subscriber line network the RADSL modem and the RADSL Digital Subscriber line Access Multiplexer (re-)negotiate an upstream and downstream data rate over the line in between. In this situation the network neighbourhood of the data sink is the ADSL line in between the ADSL modem and ADSL DSLAM. The status of this ADSL line may be the data rate. Another network status in its neighbourhood may be the quality of signal received by the data sink that may be observed by monitoring loss of frames or a bit-error rate at the data sink. An alternative network status in its neighbourhood, may be the data rate in case of Inverse multiplexing for ATM wherein the data rate mainly is determined by the number of active physical interfaces grouped into one logical interface. Here the number of active physical interfaces are monitored.

The network status reporting method is either initiated by the data source through the requesting for a report on the network status of the communications network or initiated by the data sink by sending a report on the network status of the communications network. These are alternative solutions for the triggering of the network status reporting method within the communications network. If the data source initiates the request for a report, the disadvantage is the use of network bandwidth for sending the request for a report over the path between the data source and the data sink and besides the delay of receiving the request for a report. Moreover the request may be redundant because there may not be any status change at the data sink neighbourhood. On the other hand, if the data sink initiates the status reporting method the reporting may be done only when a status change has occurred and additionally there is no superfluous bandwidth consumption.

BRIEF DESCRIPTION OF THE DRAWINGS

The above and other objects and features of the invention will become more apparent and the invention itself will be best understood by referring to the following description of an embodiment taken in conjunction with the accompanying drawing FIG. 1 representing a communication network wherein the network status reporting feedback method of the present invention is implemented.

DETAILED DESCRIPTION OF THE INVENTION

Figure 1:
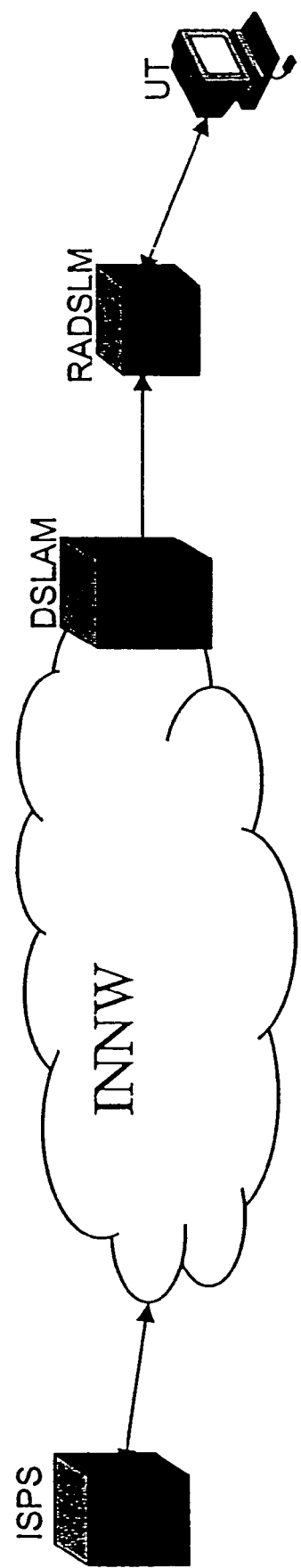

In the following paragraphs, referring to the drawing, an implementation of the present invention will be described. In the first paragraph of this description, the main elements of the communications network as presented in FIG. 1 wherein the execution of the method for network status reporting, is described. This part is succeeded by a description wherein all connections between the before mentioned network elements and described components are defined. In the following paragraph the actual execution of the network status reporting is described.

The essential elements of the communications network of the embodiment according to the present invention are at first the user terminal UT, a rate adaptive asynchronous digital subscriber line modem RADSLM, a digital subscriber line access multiplexer DSLAM, the internet network INNW and at last the internet service provider server ISPS.

In order to keep simplicity in this description it is chosen to describe only one user terminal UT although there is normally a plurality of user terminals present in such a communications network. In this embodiment this user terminal is a personal computer. Further, also in order to keep simplicity in this description it is chosen to only describe one rate adaptive asymmetrical digital subscriber line modem RADSLM that handles the conversion of the rate adaptive asymmetrical digital subscriber line-signal, the rate adaptive asymmetrical digital subscriber line further referred to as RADSL, into a format accessible for the present user terminal UT. The rate adaptive asymmetrical digital subscriber line modem RADSLM is able to detect the influence of environmental factors such as weather conditions and radio frequency interference, on the signal-quality on the line between the rate adaptive asymmetrical digital subscriber line modem RADSLM and the a digital subscriber line access multiplexer DSLAM. In reaction on a quality of signal change the rate adaptive asymmetrical digital subscriber line modem RADSLM may start a re-negotiation with the adjacent digital subscriber line access multiplexer DSLAM in order to change the data rate on the meant ADSL-line.

The digital subscriber line access multiplexer DSLAM present, handles the linking of many customer Rate adaptive asymmetrical digital subscriber line connections to a single Internet protocol link and vice versa. It participates, as mentioned before, in the re-negotiating a data rate between the digital subscriber line access multiplexer DSLAM and the rate adaptive asymmetrical digital subscriber line modem RADSLM. The internet protocol is further referred to as IP.

Further there is an internet network INNW present containing a number of intermediate network nodes, that are not presented in FIG. 1. These intermediate network nodes are constituted by either routing or switching network elements.

Still there is an internet service provider server ISPS, which is a network element at the service provider premises and is able to send data with an adaptable data transmission rate towards a requesting user.

The internet service provider server ISPS is coupled to the internet network INNW via an IP-link. Further the intermediate network nodes are all interconnected via IP-links. The digital subscriber line access multiplexer DSLAM is also coupled via an IP-link to the internet network INNW and the digital subscriber line access multiplexer DSLAM is coupled via a common known PSTN twisted pair copper wire to the RADSL modem and the user terminal is coupled to the RADSL modem.

In order to explain the operation of the present invention it is assumed that the internet service provider server sends data via the internet network INNW and the digital subscriber line access multiplexer DSLAM towards the rate adaptive asymmetrical digital subscriber line modem RADSLM that hands over the data to the user at the personal computer UT. This data transmission is performed at a certain data rate.

Later, at a certain point of time, the weather conditions get worse, hence also the quality of signal on the ADSL-line decreases. As a result the rate adaptive asymmetrical digital subscriber line modem RADSLM and the digital subscriber line access multiplexer DSLAM re-negotiate another, lower transmission rate on the ADSL-line. If the internet service provider server ISPS continues transmitting data at the same rate there may be loss of data because of the reduced transmission rate at the ADSL-line. To avoid this situation, the rate adaptive asymmetrical digital subscriber line modem RADSLM sends a report towards the internet provider service server ISPS over the internet network INNW. The intermediate network nodes of the internet network forward this report according to well-known IP routing techniques. At reception of the meant report by the internet service provider server ISPS this server adapts its transmission rate based on the current transmission rate indicated by the received report.

It is to be remarked that in another embodiment, the initiative for reporting may be undertaken by the digital subscriber line access multiplexer DSLAM instead of the rate adaptive digital subscriber line modem RADSLM.

A further remarked is that instead of the data sink, the digital subscriber line access multiplexer also may apply the network status reporting to the data source.

A subsequent remark is that the network status reporting also may be applied in other rate adaptive networks but also in completely different networks than the in this embodiment described ADSL access network, such as a mobile network like Global System for Mobile communication, further referred to as GSM, wherein the network status may be the data rate on the mobile link between a GSM terminal and an "adjacent" base station. The network status here, may be determined by the data sink which in this situation may be the mentioned "adjacent" base station or even the GSM terminal itself.

The present invention may also be applicable within a satellite communications network and the adjacent terrestrial network.

Although the above embodiments of the invention have been described by means of functional blocks, their detailed realisation based on their functional description should be obvious for a person skilled in the art and is therefore not described.

While the principles of the invention have been described above in connection with specific apparatus, it is to be clearly understood that this description is made only by way of example and not as a limitation on the scope of the invention, as defined in the appended claims.

The invention claimed is:

1. A network status reporting method for reporting in a communications network a network status information to a data source with an adaptive transmission rate in order to enable said data source to adapt said transmission rate based on said network status information, said communications network further comprising at least one intermediate network node, and a data sink, wherein only said data sink reports to said data source on said network status information of said communications network in a neighbourhood around the data sink, wherein said report of the data sink is forwarded via the at least one intermediate network node, wherein no intermediate network node reports to said data source on a network status information of said communications network in a neighbourhood around the at least one intermediate network node, wherein said communications network is a heterogeneous network comprising at least two different networks at least one of which comprises the data sink and at least one intermediate node from the at least one intermediate network node and is not configured to perform available bit rate control technique, and wherein the data sink initiates said reporting of the network status information of said communications network in the neighbourhood around the data sink to said data source without a request from said data source.

2. The network status reporting method according to claim 1, wherein one of the at least two different networks form the neighborhood around the data sink and wherein the neighborhood around the data sink is a different type of network from a network formed by the at least one intermediate network node.

3. The network status reporting method according to claim 1, wherein the data sink is connected to a network termination element via a first communication network and wherein said network termination element is connected to the data source via the at least one intermediate network node of a second communication network, and wherein the first communication network is a different type of network from the second communication network.

4. A communications network comprising:
at least one data source with an adaptive transmission rate;
at least one intermediate node; and
at least one data sink,
wherein said data source adapts said transmission rate on the basis of network status information, and wherein only said data sink is able to report said network status information of said communications network in a neighbourhood of the data sink to said data source, the report of the data sink is forwarded to said data source via the at least one intermediate node and no intermediate node is able to report a network status information of said communications network in a neighbourhood around the at least one intermediate node to said data source,
wherein said communications network is a heterogeneous network comprising at least two different networks,
wherein at least one of said at least two different networks comprises the data sink and at least one intermediate node from the at least one intermediate network node and is not configured to perform available bit rate control technique, and
wherein the data sink initiates said reporting of the network status information of said communications network in the neighbourhood of the data sink to said data source without a request from said data source.

5. Communications network according to claim 4, wherein said data sink is a line termination in an access network of said communications network.

6. Communications network according to claim 4, wherein said data sink is a network termination in an access network of said communications network.

7. Communications network according to claim 5, wherein said network status information of said communications network in the neighbourhood around the data sink is a capacity of a link between a network termination and said line termination in said access network of said communications network.

8. The data source being used in the communications network according to claim 4.

9. The data sink being used in the communications network according to claim 4.

10. Data sink according to claim 9, wherein said data sink is configured to regularly report to said data source on said network status information of said communications network in the neighbourhood of the data sink.

11. The communication network according to claim 4, wherein:
the network status information of said communications network in the neighbourhood of the data sink is information about the status of a network segment around the data sink,
the network status information of said communications network in the neighbourhood of the data sink comprises a report about at least one of: congestion, radio-frequency interference, and weather condition in the network segment around the data sink, and
the report is communicated to the data source.

12. The communications network according to claim 4, wherein the data sink is connected to a network termination element via a first communication network and wherein said network termination element is connected to the data source via the at least one intermediate network node of a second communication network, and wherein the first communication network is a different type of network from the second communication network.

13. A communications system comprising:
a data source with an adaptive transmission rate;
a line termination element;
a network termination element connected to the line termination element via a first network; and
at least one intermediate node connecting the data source to the line termination element via a second network;
wherein the data source adapts the transmission rate on the basis of a network status reported by at least one of the line termination element and the network termination element,
wherein the network status is determined based on a quality of signal of the first network only, and
wherein the first network comprises a digital subscriber line and the second network comprises a frame relay network.

14. The communications system according to claim 13, wherein the first network is of a different type than the second network, and comprise a heterogeneous network system.

15. The communications system according to claim 13, wherein the line termination element and the network termination element negotiate a transmission rate for the first network, and wherein one of the line termination element and the network termination element reports the network status only when the transmission rate in the first network is changed.

16. The communication system according to claim 15, wherein the network termination element detects an influence of environmental conditions on the transmission rate of the first network and, based on the detected influence, the network termination element and the line termination element re-negotiate the transmission rate.

17. The communication system according to claim 13, wherein the network termination element comprises a modem and the line termination element comprises a multiplexer.

18. The communication system according to claim 13, wherein the line termination element is a data sink.

19. A network status reporting method comprising:
   a data sink reporting to a data source status information of a first communication network connected to the data sink;
   at least one intermediate network node transmitting said report in a second communication network connected to the data source; and
   said data source adjusting transmission rate based on said received report,
   wherein only said data sink reports to said data source on said status information of said first communication network, and none of said at least one intermediate network node report to said data source on a network status of said second communication network near said at least one intermediate network node, and
   wherein the second communication network is a frame relay network.

20. The network status reporting method according to claim 19, wherein the data sink is connected to a modem via the first communication network and wherein said modem is connected to the data source via the at least one intermediate network node of the second communication network.

21. The network status reporting method according to claim 20, wherein the second communication network is internet and wherein the first communication network is public switch telephone network.

22. The network status reporting method according to claim 19, wherein the data sink is connected to a network termination element via the first communication network and wherein said network termination element is connected to the data source via the at least one intermediate network node of the second communication network.

23. A network status reporting method comprising:
   a data sink reporting to a data source status information of a first communication network connected to the data sink;
   at least one intermediate network node transmitting said report in a second communication network connected to the data source; and
   said data source adjusting transmission rate based on said received report,
   wherein only said data sink reports to said data source on said status information of said first communication network, and none of said at least one intermediate network node report to said data source on a network status of said second communication network near said at least one intermediate network node,
   wherein the data sink reports to the data source the status information of the first communication network connected to the data sink only when a change in status of the first communication network occurs, and
   wherein at least one of the first communication network and the second communication network cannot perform available bit rate control technique.

24. A communications network comprising:
   at least one data source with an adaptive transmission rate;
   at least one intermediate node; and
   at least one data sink,
   wherein said data source adapts said transmission rate on the basis of a network status information, and wherein only said data sink is able to report said network status information of said communications network in a neighbourhood of the data sink to said data source and no intermediate node is able to report a network status information of the communication network in a neighbourbood around the at least one intermediate node to said data source,
   wherein said communications network is a heterogeneous network comprising at least two different networks, and
   wherein said neighborhood around the data sink comprises a frame relay network and the at least one intermediate node forms part of a packet network.

* * * * *